(12) United States Patent
Soragavi et al.

(10) Patent No.: US 11,689,469 B2
(45) Date of Patent: Jun. 27, 2023

(54) ASSESSMENT AND DYNAMIC QUARANTINE OF DEVICES WITH ANOMALOUS BEHAVIORAL PATTERN

(71) Applicant: HEWLETT PACKARD ENTERPRISE DEVELOPMENT LP, Houston, TX (US)

(72) Inventors: Nikhil Shrishail Soragavi, Bangalore (IN); Amol Kelkar, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 62 days.

(21) Appl. No.: 17/515,395

(22) Filed: Oct. 29, 2021

(65) Prior Publication Data
US 2023/0135328 A1    May 4, 2023

(51) Int. Cl.
| | |
|---|---|
| *H04L 47/32* | (2022.01) |
| *H04L 12/18* | (2006.01) |
| *G06F 16/22* | (2019.01) |
| *H04L 43/16* | (2022.01) |
| *H04L 41/06* | (2022.01) |

(52) U.S. Cl.
CPC ............. *H04L 47/32* (2013.01); *G06F 16/22* (2019.01); *H04L 12/18* (2013.01); *H04L 41/06* (2013.01); *H04L 43/16* (2013.01)

(58) Field of Classification Search
None
See application file for complete search history.

(56) References Cited

U.S. PATENT DOCUMENTS

| | | | | |
|---|---|---|---|---|
| 2007/0280108 A1* | 12/2007 | Sakurai | ............... | H04L 12/1868 370/232 |
| 2013/0028130 A1* | 1/2013 | Breslau | ............... | H04L 43/0817 370/252 |
| 2016/0057045 A1* | 2/2016 | Gustin | ............. | H04L 12/40176 370/254 |

* cited by examiner

*Primary Examiner* — Anh Ngoc M Nguyen
(74) *Attorney, Agent, or Firm* — Sheppard Mullin Richter & Hampton LLP

(57) ABSTRACT

In computer networks, unicast and multicast are information transmission methods. Multicast is when one sender station or device transfers information to all of the other stations or devices in the computer network. Multicast packets sent from devices in a network can be sent directly to a server that will monitor and record the number of multicast packets being submitted from each device in the network. The server may perform actions to regulate the transmission of multicast packets if one or more devices is transmitting too many multicast packets in the network. Thus, the server will be able to monitor and regulate the performance, security, and traffic flow of data in the network, and prevent any deficiency in the network communication due to an excess amount of multicast packets being transmitted.

20 Claims, 7 Drawing Sheets

Computing Component 400

Hardware Processors 402

Machine-Readable Storage Media 404

Obtain Identity Information from Multicast Packets
408

Determine Quantity of Multicast Packets Received
410

Obtain Stored Quantity of Multicast Packets
412

Determine Total Quantity of Multicast Packets
414

Obtain Baseline Range of Multicast Packets
416

Determine Difference between Total Quantity and Baseline Range
418

Determine if Difference is Greater than a Threshold
420

FIG. 4

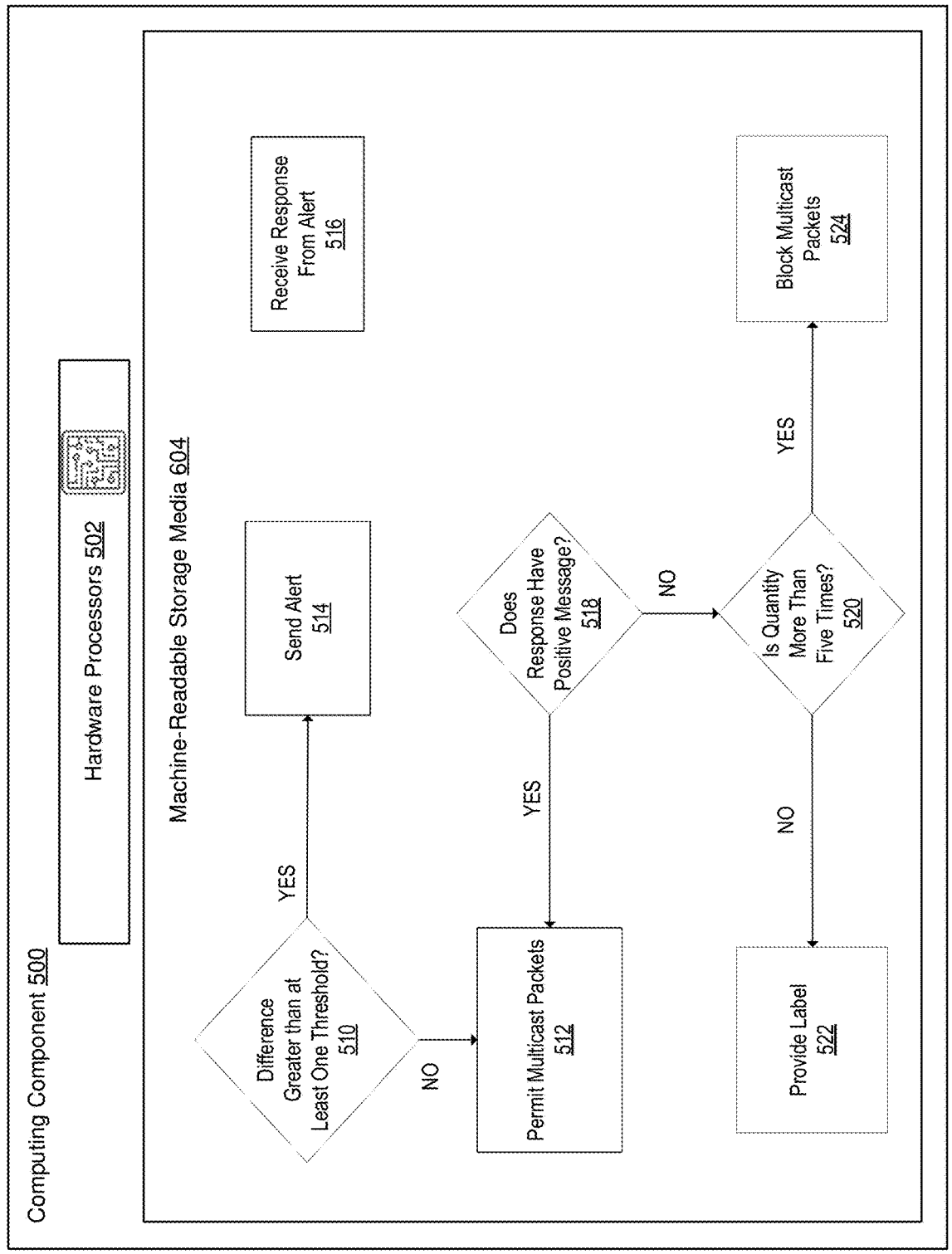

ASSESSMENT AND DYNAMIC QUARANTINE OF DEVICES WITH ANOMALOUS BEHAVIORAL PATTERN

BACKGROUND

Networks can contain a large number of plug and play devices, including IoT devices like computer monitors, televisions, printers, cell phones, and sensors. Once a plug and play device is connected to a computing system, an operating system and a Basic Input/Output System (BIOS) of the computing system may automatically recognize an identity and configuration of the plug and play device. Upon recognition, the computing system may load appropriate software, or device drivers, to render the plug and play device operational. The computing system may further allocate resources, resolve conflicts, configure other settings and parameters, and notify other drivers or applications of the plug and play device.

Each device in a network can send out large amounts of multicast and unicast packets, where multicast packets are sent to numerous other devices within a same layer 2 (L2) network and unicast packets are sent to one particular other device in the network. Generally, multicast packets are periodically sent at set durations. But now, multicast packets are sent out from each device more frequently due to the devices having more advanced features such as video streaming. The increase in multicast packets results in increased data traffic and bandwidth, thereby decreasing network experience.

BRIEF DESCRIPTION OF THE DRAWINGS

The present disclosure, in accordance with one or more various embodiments, is described in detail with reference to the following figures. The figures are provided for purposes of illustration only and merely depict typical or exemplary examples.

FIG. 4 is an illustration of a server analyzing multicast packets in accordance with various examples of the present disclosure.

FIG. 5 is an illustration of a server determining whether multicast packets from a device should be blocked in accordance with various examples of the present disclosure.

The figures are not exhaustive and do not limit the present disclosure to the precise form disclosed.

DETAILED DESCRIPTION

In computer networks, unicast and multicast packets are information transmission methods. Unicast packets involve one station or device transferring information to one receiver station or device. Multicast packets involve a sender station or device transferring information to multiple other stations or devices in the computer network. Essentially, multicast is a one-to-many communication method. While the use of multicast packets may be more efficient than the use of unicast packets, in that multiple receiver stations or devices may receive a transmission from a single sender station or device, multicast packets entail more bandwidth allocation and usage which can increase the amount of traffic flow in the network. Given the increase in computing devices present in today's computer networks, and that each computing device has more advanced applications or features that require larger amounts of data, having too many multicast packets in a computer network can quickly overload the network, thereby manifesting in drastically decreased network performance. Additionally, the advanced applications in computing devices tend to automatically transmit multicast packets at unexpected intervals. The unexpected or unpredictable transmission of multicast packets may lead to the computer network being overloaded, thus triggering decrease of performance of communication in the network and overall network experience.

Described herein are solutions that address the problems described above. Multicast packets sent from client devices in a network can be sent directly to a server that will monitor and record the number of multicast packets being transmitted from each device in the network. The server may further monitor whether or not devices are submitting more than a set range of multicast packets for each type of device in a particular duration. If the server determines that a particular device in the network is transmitting too many multicast packets, then the server may send a notice to the particular device to decrease the number of multicast packets that the particular device is transmitting, or block all multicast packets being transmitted from the particular device. Thus, the server will be able to monitor and regulate the performance, security, and traffic flow of data in the network, and prevent or mitigate any deficiency in the network communication due to an excess amount of multicast packets being transmitted.

Figure 1A:
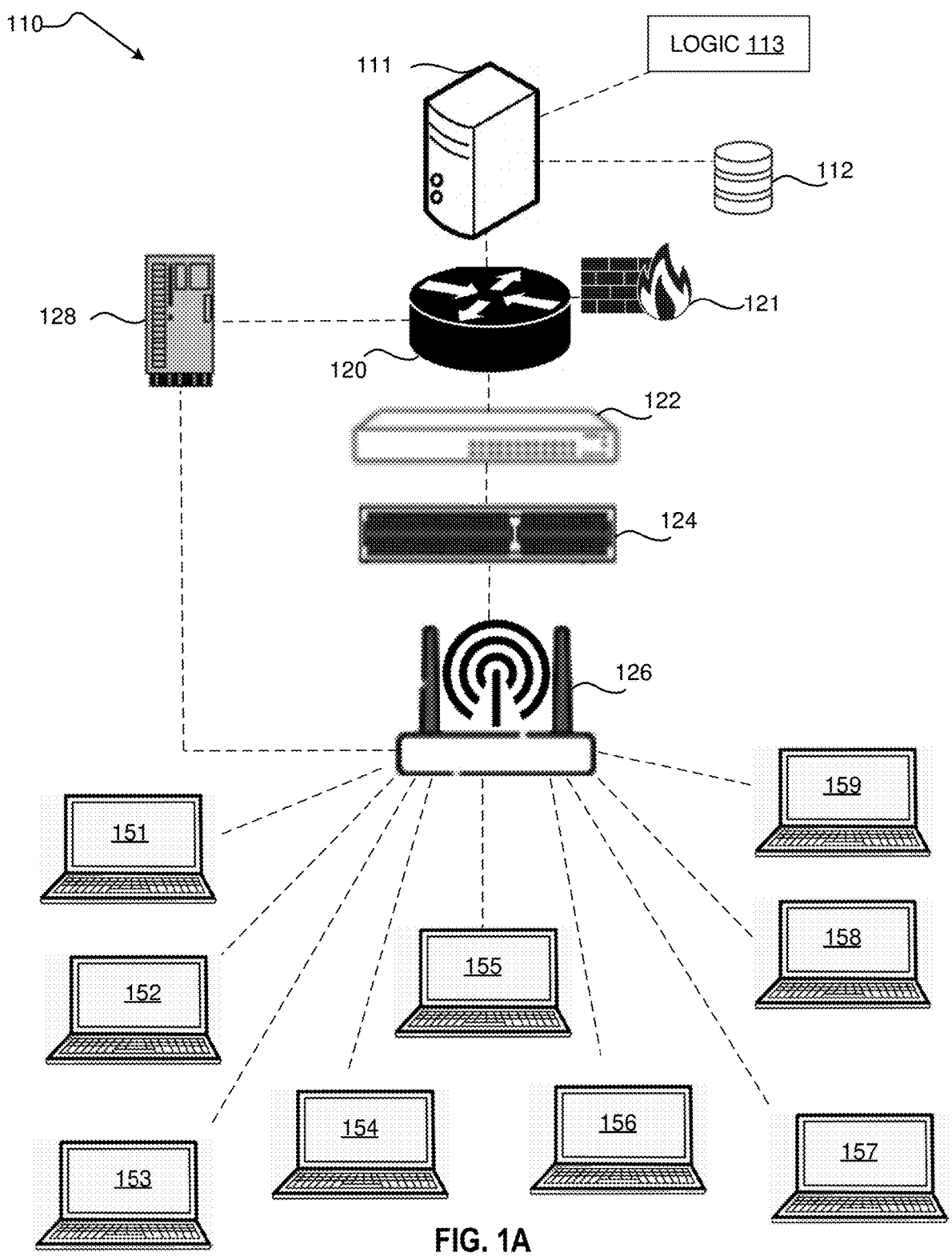
FIG. 1A is an example illustration of a computing system that authenticates and authorizes client devices to access a network in a streamlined manner, according to examples described in the present disclosure.

FIG. 1A is an example illustration of computing system 110 including one or more computing components that may encompass any of a server 111, a router 120, a switch 122, a network controller 124, an access point 126, and a DHCP server 128. In some examples, the router 120 may be associated with a firewall 121. The server 111 may further include or be associated with a database or cache 112 (hereinafter "database") which stores attributes of particular client devices and access control lists or policies associated with particular client devices, such as client devices 151-159, which connect to a network via the access point 126. In some examples, any or all of the client devices 151-159 may include plug and play devices. Although only nine client devices are illustrated in FIG. 1A, any number of client devices may be connected via the access point 126. The database 112 may be integrated or embedded within the server 111 or spatially separated from the server 111. The access control lists may be stored as files and/or may be indexed. In some examples, the access control lists or policies may include particular access levels and/or access privileges to be assigned to each client device depending on a group or classification that the client device belongs to. For example, the access privileges may indicate a subset (e.g., a portion or all) of data resources, such as particular data servers, databases, platforms, objects, file directories, or files that each client device is authorized to access, particular protocols (e.g., Hypertext Transfer Protocol (HTTP) or File Transfer Protocol (FTP)) that each client device may utilize to access data resources, a transmission speed or rate to be provided to each of the client devices, one or more Vendor Specific Attributes (VSA), and/or a particular VLAN to be assigned to each client device. In some examples, the VSA may include bandwidth on incoming and/or outgoing traffic, and download and/or upload speeds. The access control lists or policies may be stored in the database 112 of the server 111, rather than at other computing components such as the router 120, so that the server 111 may centrally update the access control lists or policies and propagate any updates to other computing components in the network.

Figure 1B:
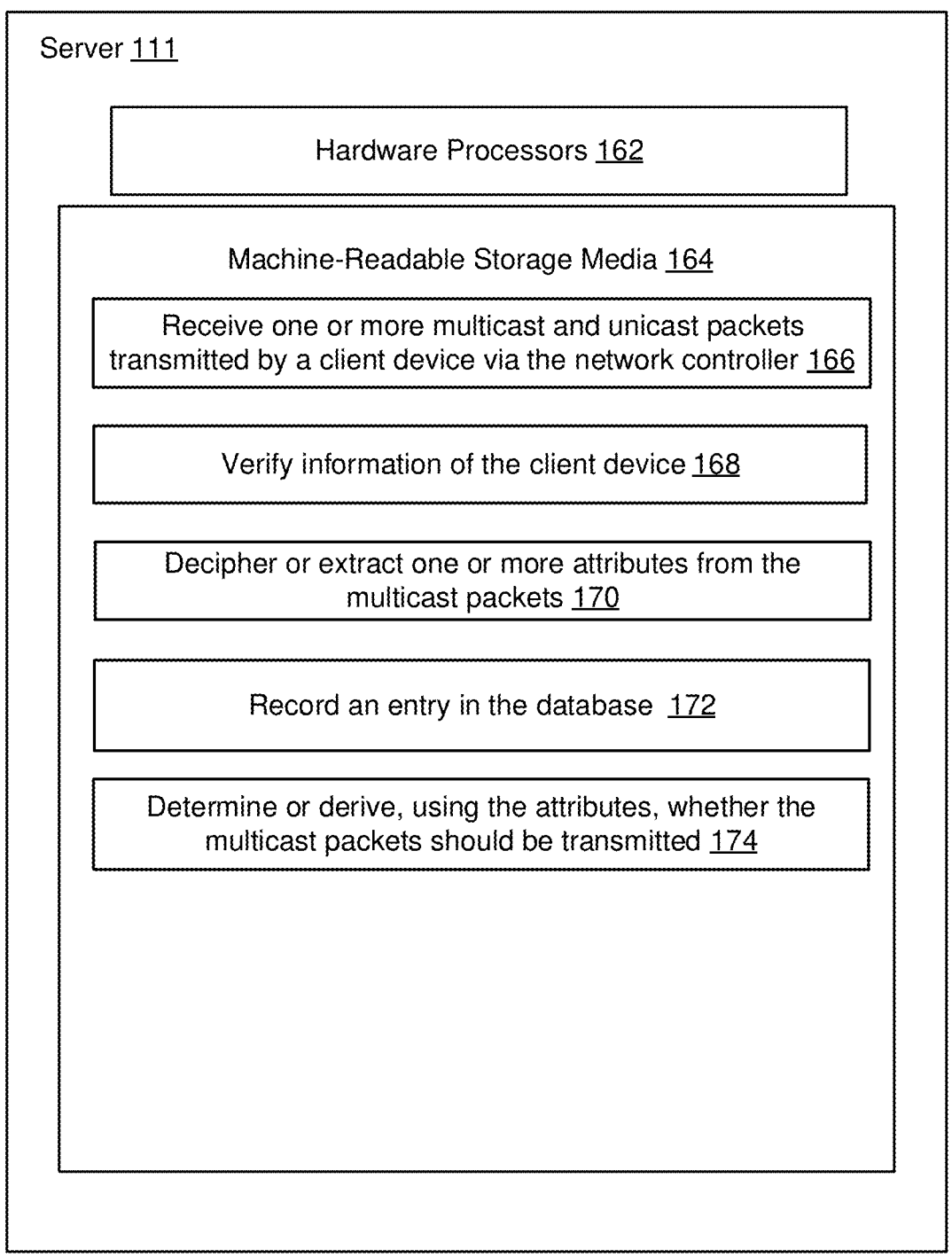
FIG. 1B is an illustration of analyzing multicast packets from a device in accordance with various examples of the present disclosure.

Each of the computing components may include one or more hardware processors and logic that implements instructions to carry out the functions of the computing components. In particular, as illustrated in FIG. 1B, the server 111 may include or be associated with one or more hardware processors 162 and logic 113 that implements instructions or protocols to carry out the functions of the server 111. The logic 113 may execute instruction 166 to receive one or more multicast and unicast packets transmitted by a client device via the network controller 124. The logic 113 may execute instruction 168 to verify information of the client device. The logic 113 may execute instruction 170 to decipher or extract one or more attributes from the multicast packets, including a media access control (MAC) address of the client device, one or more hardware attributes such as a type of client device (e.g., tablet, desktop computer, IoT device), and/or one or more software attributes of the client device such as a software version and/or software components. The logic 113 may execute instruction 172 to record an entry in the database 112 regarding the attributes. The logic 113 may execute instruction 174 to determine or derive, using the attributes, whether the multicast packets should be transmitted.

Figure 2:
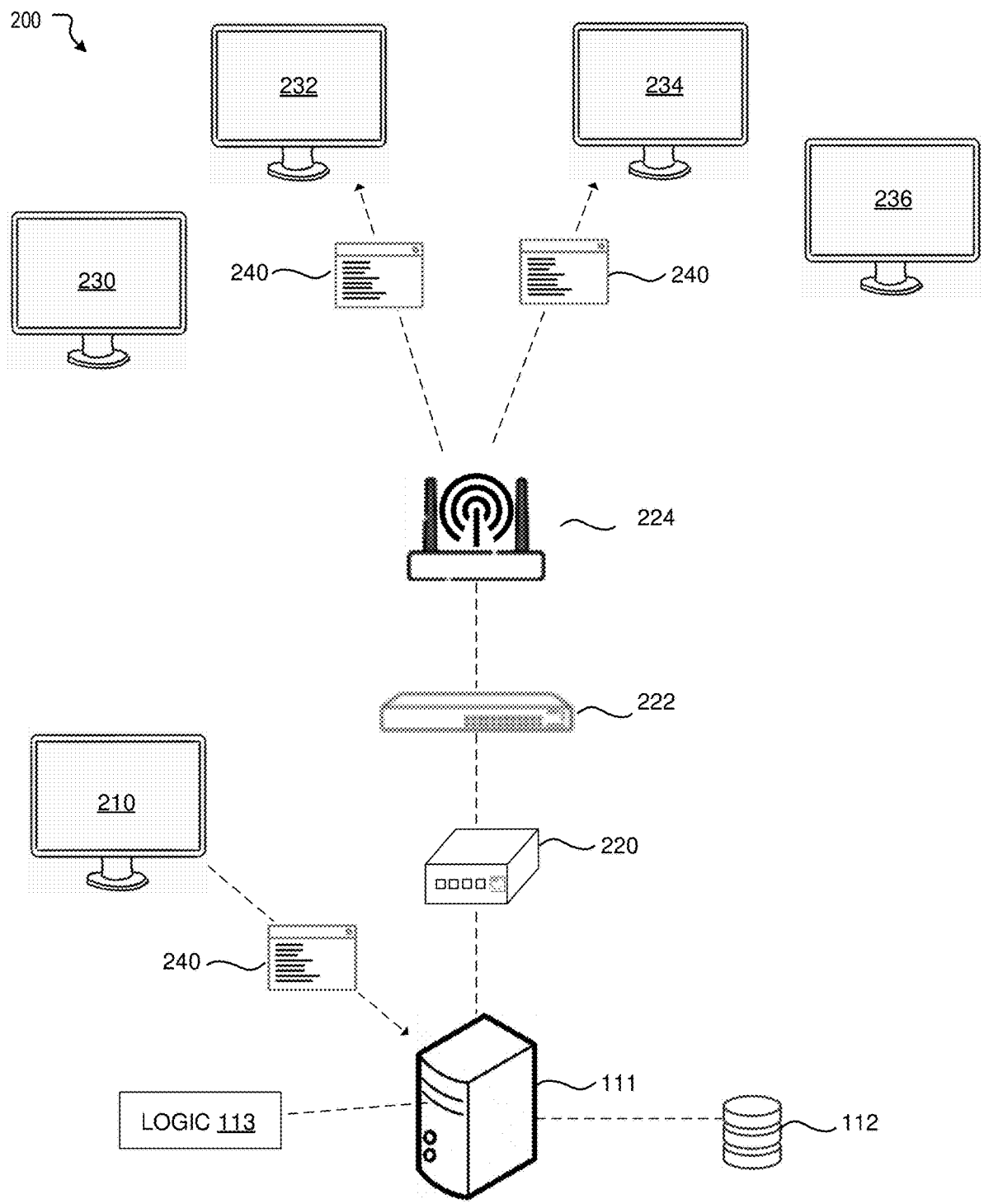
FIG. 2 is an illustration of an example transmission of a multicast packet in accordance with various examples of the present disclosure.

FIG. 2 is an illustration of an example network 200 over which transmission of a multicast packet is implemented in accordance with various examples of the present disclosure. In some examples, the network 200 can comprise or include one or more computing components that may encompass any of the server 111, a network device 220, a network controller 222, an access point 224, and client devices 210, 230, 232, 234, and 236. FIG. 2 elaborates on specific components of FIGS. 1A and 1B while elucidating an exchange of information among the components. The client devices 210, 230, 232, 234, and 236 can be any of computing devices, such as computers, mobile phones, tablet devices, etc. The network device 220 may be implemented as the router 120 or switch 122 of FIG. 1A. The network device 220 can be a router or a switch that is configured to connect various computing components in a network, such as the client device 210, the client device 230, the client device 232, the client device 234, the client device 236, the network controller 222, the access point 224, and the server 111. The server 111 may further include or be associated with the database or cache 112 (hereinafter "database") which stores attributes of particular client devices, servers, and access control lists or policies associated with the client devices 210, 230, 232, 234, and 236, which connect to a network via the access point. In some examples, the client devices 210, 230, 232, 234, and 236 can access the internet, wirelessly, through Wi-Fi (e.g., IEEE 802.11), Bluetooth (e.g., IEEE 802,15,1), or cellular connection (e.g., long-term evolution, $5^{th}$ generation cellular networks, etc.) to wirelessly access the server 111 through the network device 220. The server 111 can implement software and/or hardware, such as web servers, application server, communications server, database server, etc. The server 111 can access the internet through Wi-Fi, Bluetooth, phone line, or LAN/WLAN network interface. In other examples, the network device 220 can be an enterprise intranet (e.g., a private network) and the client devices 210, 230, 232, 234, and 236 can access the enterprise intranet, wirelessly, through the network device 220 to access data files or other enterprise data. In some cases, the network device 220 can be a network link (e.g., Wi-Fi, Ethernet port, router, switch, etc.) that allows a plurality of computing components to communicate with each other. The network controller 222 and the access point 224 can be configured to allow computing components in a network such as the client device 210, the client device 230, the client device 232, the client device 234, the client device 236, and the server 111 to connect through the network device 220. In this example, the network device 220 can establish a client-client communication between the client device 210 and each of the client devices 230, 232, 234, and 236.

In some examples, a transmission may begin when the client device 210 transmits a multicast packet 240 into a network. The multicast packet 240 may be addressed to any subset (e.g., all or a portion of) the remaining client devices in the network, such as client devices 230, 232, 234 and 236. During the transmission the client device 210 can establish a communication with each of the client devices 230, 232, 234, and 236. The server 111 can be configured to act as a link to establish the client-client communication between the client device 210 and each of the client devices 230, 232, 234, and 236. The server 111, and the client devices 210, 230, 232, 234, and 236 may connect to one another in a network via the network device 220, the network controller 222, and/or the access point 224. In some examples, once the client device 210 transmits the multicast packet 240, the multicast packet 240 may be received by the server 111 via the access point 224. The server 111 may then read the multicast packet 240 to obtain identity information. The identity information may include, without limitation, source device address, destination device addresses, source device port, destination device ports, and/or attributes such as source device type, destination device types, length of frames or size of packets transmitted, number of frames or number of packets transmitted, variance in sizes of frames or packets, variance in lengths of frames or packets, frequency of packets, frequency of frames, and/or overall size of data within the frames or packets. In some examples, the multicast packet 240 of the transmission may include services that are advertised or queried for, such as a video stream, videoconferencing, or Internet Protocol television (IPTV) 210.

Once the server 111 has read and obtained the identity information of the multicast packet 240, the server 111 may record and store the identity information into the database 112. The server 111 may further analyze the identity information of the multicast packet 240, along with stored identity information of previously sent multicast packets in the database 112. Allowing identity information to be stored in the database 112 at the server 111, and the server 111 to analyze the stored identity information in the database 112 along with the identity information of the multicast packet 240 may allow the server 111 to monitor the total quantity of multicast packets being transmitted from each client device in the network. Analyzing the stored identity information and the identity information can allow the server 111 to monitor the performance, security, and traffic flow of data in the network, and detect any anomalous behavior from the client device 210. Analyzing the stored identity information and the identity information can comprise or include determining whether the multicast packet 240 may be transmitted in the client-client communication. In some examples, determining whether the multicast packet 240 may be transmitted can comprise or include comparing the total quantity of multicast packets transmitted from the client device 210 in a set duration, based on a device type of the client device 210. The total quantity of multicast packets transmitted from the client device 210 in a set duration may be based on any number of the attributes of the identity information and stored identity information. If the total quantity of multicast packets being transmitted from the client device 210 is greater than a threshold of the device type of the client device 210, then the server 111 may detect an anomalous behavior. The server 111 may block the multicast packet 240 and not transmit the multicast packet 240 to the other client devices 230, 232, 234, and 236 upon detecting the anomalous behavior, even if any of the other client devices 230, 232, 234, and 236 query for the multicast packet 240. If the server 111 determines that a total quantity of multicast packets being transmitted from the client device 210 is below the threshold, then the server 111 may determine there is no anomalous behavior and may selectively route or transmit, in unicast format, the multicast packet 240 to any of the other client devices 230, 232, 234, and 236 that have queried for the multicast packet 240224. For example, if the other client devices 230 and 232 have queried for the multicast packet 240, then the server may initiate routing or transmitting of the multicast packet 240 to the other client devices 230 and 232, without routing or transmitting the multicast packet 240 to the other devices 234 and 236, which have not queried for the multicast packet 240. In some examples, the server 111 may initiate the transmission or routing of the multicast packet 240 to the network controller 222, which forwards the multicast packet 240 to one or more appropriate destinations (e.g., the other client devices 230 and 232 in the above scenario). Similarly, the server 111 may determine whether or not behavior by the client device 210 is anomalous based on other of the aforementioned factors such as any of lengths or sizes of frames or sizes of packets transmitted, number of frames or number of packets transmitted, variance in sizes of frames or packets, variance in lengths of frames or packets, frequency of packets, frequency of frames, and/or overall size of data within the frames or packets, and comparison of the aforementioned factors to respective thresholds.

Additionally or alternatively, when the server 111 detects the anomalous behavior from the client device 210, the server 111 may send alerts to the client device 210. The alerts may comprise or include a message (e.g., text, email, notification such as an application notification, etc.) and a sound. The client device 210 may provide a reply to the alerts to resolve the anomalous behavior. For example, if the client device 210 receives an alert regarding sending too many (e.g., above a threshold rate or number within a specified duration of time) multicast packets to the network in a set duration, then the client device 210 may send a reply that comprises of a positive message or a negative message. The positive message may be a message indicating that the client device 210 will decrease the total quantity of multicast packets it sends to the network in a set duration. The negative message may be a message indicating that the client device 210 will not decrease the total quantity of multicast packets it sends to the network in a set duration. The server 111 may allow the client device 210 to send more multicast packets to the network in response to receiving the positive message. The server 111 may block the client device 210 from sending any additional multicast packets to the network in response to receiving the negative message. Thus, in such a scenario, the server 111 may regulate a total quantity of multicast packets transmitted across a network from each client device in the network within a set duration to monitor the performance, security, and traffic flow of data in the network, and prevent any deficiency in the network communication.

Additionally or alternatively, the server 111 may send an alarm to an administrator to provide notification of the anomalous behavior. The administrator may provide feedback in response to the alarm to resolve the anomalous behavior. For example, if the administrator receives an alarm regarding the client device 210 sending a total quantity of multicast packets greater than a threshold, the administrator may send a feedback to label the client device 210 as high risk. Labeling a client device as high risk may provide notice to all other computing components of the network of the transmission. Additionally or alternatively, the administrator may send a feedback to add the client device 210 to a restricted list, wherein the restricted list comprises or includes computing components such as client devices that may not transmit any multicast packets to the network. Once the client device 210 is added to the restricted list, the server 111 may block and close any further multicast packets received from the client device 210. Thus, in such a scenario, the server 111 may regulate a total quantity of multicast packets transmitted across a network from client devices within a set duration to monitor the performance, security, and traffic flow of data in the network, and prevent any deficiency in the network communication.

Additionally or alternatively, the server 111 may, upon comparing a total quantity of multicast packets being transmitted from the client device 210 to a threshold over a particular set duration, detect or determine that the total quantity is above the threshold over the particular set duration, the server 111 may implement further detection of a total quantity of multicast packets being transmitted from the client device 210 over a subsequent particular set duration. For example, if the server 111 detecting that a total quantity of multicast packets being transmitted from the client device 210 exceeded or violated the threshold over a past minute or hour, or any set amount of time, then the server 111 may collect additional information regarding the total quantity of multicast packets being transmitted from the client device 210 over a subsequent minute or hour, or any set amount of time. Additionally or alternatively, the server 111 may perform such continuous detection for other parameters included in the identity information, such as any of lengths or sizes of frames or sizes of packets transmitted, number of frames or number of packets transmitted, variance in sizes of frames or packets, variance in lengths of frames or packets, frequency of packets, frequency of frames, and/or overall size of data within the frames or packets, if any of the other parameters exceed respective thresholds.

Figure 3:
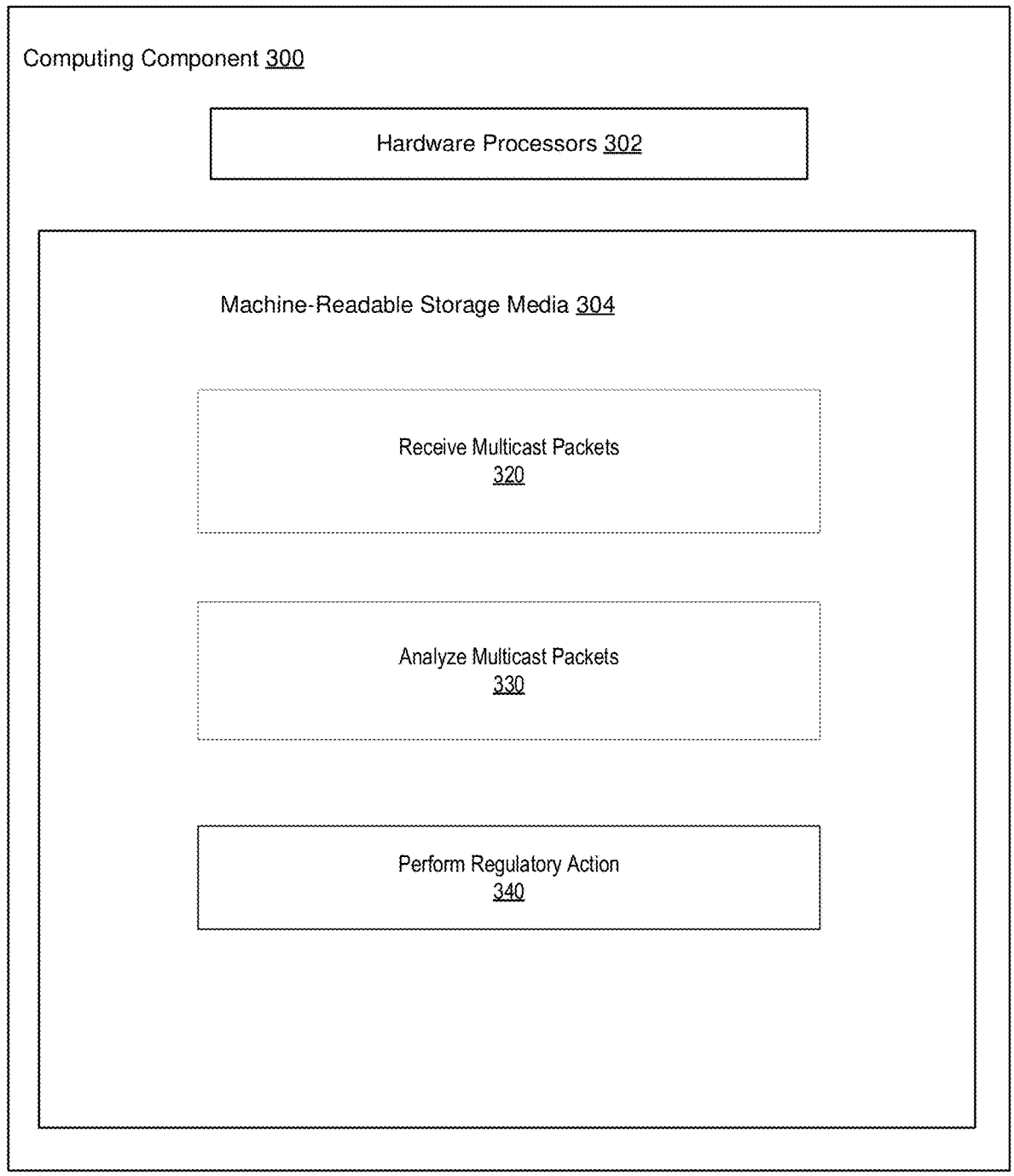
FIG. 3 is an illustration of operations of a server regarding multicast packets in accordance with various examples of the present disclosure.

FIG. 3 illustrates a computing component 300 that includes one or more hardware processors 302 and machine-readable storage media 304 storing a set of machine-readable/machine-executable instructions that, when executed, cause the hardware processor(s) 302 to perform an illustrative method of reducing computing costs while maintaining network services and performance. It should be appreciated that there can be additional, fewer, or alternative steps performed in similar or alternative orders, or in parallel, within the scope of the various examples discussed herein unless otherwise stated. The computing component 300 may be implemented as the server 111 of FIG. 1A, and FIG. 2. FIG. 3 summarizes and further elaborates on some aspects previously described.

At instruction 320, the hardware processor(s) 302 may execute machine-readable/machine-executable instructions stored in the machine-readable storage media 304 to receive multicast packets from one or more client devices (e.g., any of the client devices illustrated in FIG. 1A or FIG. 2) in a network. In some examples, a first client device may send out a multicast packet to the network for all of the other client devices in the network to receive. The first client device may be one of a plurality of client devices in the network. The one or more client devices in the network may each be a computing device, such as a computer, a mobile phone, a tablet device, etc. The multicast packets can be in the form of messages, advertisements, videos, files, etc. Many variations are possible. After the first client device sends a multicast packet to the network, the server receives the multicast packet and selectively routes or transmits the multicast packet, in a unicast format, to any other client devices that have queried for the multicast packet, as described with respect to FIG. 2. The server may receive a plurality of multicast packets from one or more client devices in the network simultaneously.

At instruction 330, the hardware processor(s) 302 may execute machine-readable/machine-executable instructions stored in the machine-readable storage media 304 to analyze multicast packets that were received from one or more client devices in a network. In some examples, the server may receive a multicast packet from a first client device in the network. The server may then analyze the multicast packet by reading and obtaining identity information of the multicast packet. The identity information may comprise any of the identity information referred to with respect to FIG. 2, including, source device address, destination device addresses, source device port, destination device ports, and/or attributes such as source device type, destination device types, length of frames or size of packets transmitted, number of frames or number of packets transmitted, variance in sizes of frames or packets, variance in lengths of frames or packets, frequency of packets, frequency of frames, and/or overall size of data within the frames or packets. After the server has read and obtained the identity information of the multicast packet, the server may store and record the identity information in a database. The server may further obtain, from the database, stored identity information of a plurality of previously sent multicast packets sent from the first client device in a set duration. For example, the previously sent multicast packets may be from a duration of a previous hour, eight hours, 24 hours, 48 hours, or within a past week. The server may analyze the identity information of the multicast packet and the stored identity information together. Allowing identity information to be stored in the database by the server, and the server to analyze the stored identity information in the database along with the identity information of the received multicast packet may allow the server to monitor the total quantity of multicast packets being transmitted from each client device in the network. Analyzing the stored identity information and the received identity information from each client device in a network can allow the server to monitor the performance, security, and traffic flow of data in the network, and detect any anomalous behavior from the each of the plurality of client devices in the network. Analyzing the stored identity information and the identity information of the first client device can comprise or include determining whether the received multicast packet may be transmitted to the other client devices in the network. In some examples, determining whether the multicast packet may be transmitted can comprise or include comparing the total quantity of multicast packets transmitted from the first client device in a set duration, based on a device type of the first client device. The total quantity of multicast packets transmitted from the first client device in a set duration may be based on any number of the attributes of the identity information and stored identity information. If the total quantity of multicast packets being transmitted from the first client device is greater than a threshold of the device type of the first client device, then the server may detect an anomalous behavior.

At instruction 3430, the hardware processor(s) 302 may execute machine-readable/machine-executable instructions stored in the machine-readable storage media 304 to perform an action based on a result of the analysis performed on multicast packets from a client device. After the server has analyzed the multicast packets received from a first client device in a set duration, the server may determine if it detects an anomalous behavior from the first client device. In response to detecting an anomalous behavior from the first client device, the server may then drop or block the multicast packet without processing the multicast packet to save computational costs. If the server determines that a total quantity of multicast packets being transmitted from the first client device in a set duration is below the threshold, then the server may determine there is no anomalous behavior from the first client device and may forward the received multicast packet to the other client devices in the network.

Additionally or alternatively, when the server detects the anomalous behavior from the first client device, the server may send alerts to the first client device. The alerts may comprise or include a message (e.g., text, email, notification such as an application notification) and a sound. The first client device may provide a reply to the alerts to resolve the anomalous behavior. For example, if the first client device receives an alert regarding sending too many multicast packets to the network in a set duration, then the first client device may send a reply that comprises of a positive message or a negative message. The positive message may be a message indicating that the first client device will decrease the amount of multicast packets it sends to the network in a set duration. The negative message may be a message indicating that the first client device will not decrease the amount of multicast packets it sends to the network in a set duration. The server may allow the first client device to send more multicast packets to the network in response to receiving the positive message. The server may block the first client device from sending any additional multicast packets to the network in response to receiving the negative message. Thus, in such a scenario, the server may regulate a total quantity of multicast packets transmitted across a network from each client device in the network within a set duration to monitor the performance, security, and traffic flow of data in the network, and prevent any deficiency in the network communication.

Additionally or alternatively, the server may send an alarm to an administrator to provide notification of the anomalous behavior. The administrator may provide feedback in response to the alarm to resolve the anomalous behavior. For example, if the administrator receives an alarm regarding the first client device sending a total quantity of multicast packets greater than a threshold, the administrator may send a feedback to label the first client device as high risk. Labeling a client device as high risk may provide notice to other computing components of the network. Additionally or alternatively, the administrator may send a feedback to add the first client device to a restricted list, wherein the restricted list comprises of computing components such as client devices that may not transmit any multicast packets to the network. Once the first client device is added to the restricted list, the server may block and close any further multicast packets received from the first client device. Thus, in such a scenario, the server may regulate a total quantity of multicast packets transmitted across a network from each client device in the network within a set duration to monitor the performance, security, and traffic flow of data in the network, and prevent any deficiency in the network communication.

Additionally or alternatively, as described above with reference to FIG. 2, the server (e.g., the server 111) may compare a total quantity of multicast packets being transmitted from the first client device over a particular set duration to a threshold. Upon detecting or determining that the total quantity is above the threshold over the particular set duration, the server may implement further detection of a total quantity of multicast packets being transmitted from the first client device over a subsequent particular set duration. For example, if the server detecting that a total quantity of multicast packets being transmitted from the first client device exceeded or violated the threshold over a past minute or hour, or any set amount of time, then the server may collect additional information regarding the total quantity of multicast packets being transmitted from the first client device over a subsequent minute or hour, or any set amount of time. Additionally or alternatively, the server may perform such continuous detection for other parameters included in the identity information, such as any of lengths or sizes of frames or sizes of packets transmitted, number of frames or number of packets transmitted, variance in sizes of frames or packets, variance in lengths of frames or packets, frequency of packets, frequency of frames, and/or overall size of data within the frames or packets, if any of the other parameters exceed respective thresholds.

FIG. 4 illustrates a computing component 400 that includes one or more hardware processors 402 and machine-readable storage media 404 storing a set of machine-readable/machine-executable instructions that, when executed, cause the hardware processor(s) 402 to perform an illustrative method of reducing computing costs while maintaining network services and performance. It should be appreciated that there can be additional, fewer, or alternative steps performed in similar or alternative orders, or in parallel, within the scope of the various examples discussed herein unless otherwise stated. The computing component 400 may be implemented as the server 111 of FIG. 1A, FIG. 1B, FIG. 2, and FIG. 3. FIG. 4 summarizes and further elaborates on some aspects previously described.

At instruction 408, the hardware processor(s) 402 may execute machine-readable/machine-executable instructions stored in the machine-readable storage media 404 to obtain identity information from a received multicast packet sent from a first client device (e.g., any of the client devices illustrated in FIG. 1A or FIG. 2). The server may read and obtain identity information of the received multicast packet sent from the first client device. The identity information may comprise or include source device address, destination device addresses, source device port, destination device ports, and/or attributes such as source device type, destination device types, length of frames or size of packets transmitted, number of frames or number of packets transmitted, variance in sizes of frames or packets, variance in lengths of frames or packets, frequency of packets, frequency of frames, and/or overall size of data within the frames or packets. The server may further store and record the identity information of the received multicast packet sent from the first client device to the database.

At instruction 410, the hardware processor(s) 402 may execute machine-readable/machine-executable instructions stored in the machine-readable storage media 404 to determine the quantity of multicast packets received from a first client device. The quantity of multicast packets is based on one or more attributes of the multicast packets obtained from the identity information. The attributes may comprise or include source device type, destination device types, length of frames or size of packets transmitted, number of frames or number of packets transmitted, variance in sizes of frames or packets, variance in lengths of frames or packets, frequency of packets, frequency of frames, and/or overall size of data within the frames or packets. For example, the quantity of multicast packets received from the first client device may be based on a combination of the number of packets transmitted, the size of the packets, and the size of the data within the packets.

At instruction 412, the hardware processor(s) 402 may execute machine-readable/machine-executable instructions stored in the machine-readable storage media 404 to obtain stored quantity of previously sent multicast packets from a database. The server may obtain, from the database, stored identity information of previously sent multicast packets sent from a first client device. The stored identity information may comprise or include source device address, destination device addresses, source device port, destination device ports, and/or attributes such as source device type, destination device types, length of frames or size of packets transmitted, number of frames or number of packets transmitted, variance in sizes of frames or packets, variance in lengths of frames or packets, frequency of packets, frequency of frames, and/or overall size of data within the frames or packets of a plurality of multicast packets sent from the first client device. The server may analyze the stored identity information to determine the stored quantity of previously sent multicast packets in a set duration. The stored quantity of previously sent multicast packets is based on one or more attributes of the plurality of previously sent multicast packets. For example, the stored quantity of previously sent multicast packets received from the first client device may be based on a combination of the total number of packets transmitted, the sum of the sizes of the packets, and the sum of the size of the data within the packets of the previously sent multicast packets from the first client device.

At instruction 414, the hardware processor(s) 402 may execute machine-readable/machine-executable instructions stored in the machine-readable storage media 404 to determine the total quantity of multicast packets sent from a first client device in a set duration. After the server has obtained and determined the quantity of multicast packets received and the stored quantity of previously sent multicast packets from the first client device, the server may add the two quantities together to determine the total quantity of multicast packets sent from the first client device in the network in a set duration.

At instruction 416, the hardware processor(s) 402 may execute machine-readable/machine-executable instructions stored in the machine-readable storage media 404 to obtain a baseline range of multicast packets sent from a first client device. The server may obtain a device type of the first client device from the identity information obtained from the multicast packet received from the first client device. The server may use the device type to obtain, from the database, a baseline range of multicast packets sent from the device type in a set duration. The database may store a plurality of baseline ranges for a plurality of device types. The plurality of baseline ranges stored in the database may be pre-recorded. The plurality of baseline ranges stored in the database may vary based on various factors of the network. The plurality of baseline ranges stored in the database may be adjusted by an administrator periodically. Many variations are possible. In some examples, the plurality of baseline ranges for the plurality of device types stored in the database may depend on a type and an operating system version of the client device.

At instruction 418, the hardware processor(s) 402 may execute machine-readable/machine-executable instructions stored in the machine-readable storage media 404 to determine a quantity difference between a total quantity of multicast packets sent from a first client device and a baseline range of multicast packets sent from the first client device. Once the server obtains the device type of the first client device and obtains the baseline range of the first client device based on the device type of the first client device, the server may determine the quantity difference between the total quantity and the upper value of the baseline range of the first client device. For example, the server determines that the total quantity of multicast packets sent from the first client device in an hour duration is 1120. The server determines that the device type of the first client device is Chromecast, based on the identity information of the multicast packets sent from the first client device. The server determines from the database that Chromecast has a baseline range of 100-210 multicast packets sent per hour. The server determines that the quantity difference between the total quantity and the upper value of the baseline range is 910 (1120 minus 210).

At instruction 420, the hardware processor(s) 402 may execute machine-readable/machine-executable instructions stored in the machine-readable storage media 404 to determine if a quantity difference between a total quantity of multicast packets sent from a first client device and a baseline range of multicast packets sent from the first client device is greater than at least one threshold. If the quantity difference is within the at least one threshold, the hardware processor(s) 402 may continue to transmit the multicast packets without blocking. The server determines the quantity difference between the total quantity of multicast packets sent from the first client device and the baseline range of multicast packets sent from the first client device by subtracting one from the other. For example, the server determines that the total quantity of multicast packets sent from the first client device in an hour duration is 1120. The server determines that the device type of the first client device is Chromecast, based on the identity information of the multicast packets sent from the first client device. The server determines from the database that Chromecast has a baseline range of 100-210 multicast packets sent per hour. The server determines that the quantity difference between the total quantity and the upper value of the baseline range is 910 (1120 minus 210). The server may obtain the threshold of multicast packets that the first client device can send in a set duration. The threshold is based on the device type of the first client device. A first threshold may be three times (3×) the upper value of the baseline range of multicast packets sent per hour for the device type of the first client device. A second threshold may be five times (5×) the upper value of the baseline range of multicast packets sent per hour for the device type of the first client device. Many variations are possible. The server determines if the quantity difference is greater than the threshold. For example, the first client device is the device type of Chromecast. The upper value of the baseline range of the Chromecast device type is 210. The first threshold corresponds to 630 and the second threshold corresponds to 1040. The quantity difference between the total quantity and the upper value of the baseline range of the Chromecast is 910. The server determines that the quantity difference is greater than the three times (3×) threshold and less than the five times (5×) threshold.

In some examples, if the first threshold is exceeded, then the server may, upon comparing a total quantity of multicast packets being transmitted from the first client device to a threshold over a particular set duration, detect or determine that the total quantity is above the threshold over the particular set duration, the server may implement further detection of a total quantity of multicast packets being transmitted from the first client device over a subsequent particular set duration. For example, if the server detects that a total quantity of multicast packets being transmitted from the first client device exceeded or violated the threshold over a past minute or hour, or any set amount of time, then the server may collect additional information regarding the total quantity of multicast packets being transmitted from the first client device over a subsequent minute or hour, or any set amount of time. Additionally or alternatively, the server may perform such continuous detection for other parameters included in the identity information, such as any of lengths or sizes of frames or sizes of packets transmitted, number of frames or number of packets transmitted, variance in sizes of frames or packets, variance in lengths of frames or packets, frequency of packets, frequency of frames, and/or overall size of data within the frames or packets, if any of the other parameters exceed respective thresholds.

The table below illustrates an example table of baseline ranges of multicast packets sent in a set duration, number of query or response packets per hour, for various types of devices in accordance with various examples of the present disclosure.

| Device | Range |
|---|---|
| Chromecast 1st Gen OS 1.36 | 100-210 |
| Chromecast 3rd Gen OS 1.49 | 190-220 |
| ATV 3rd Gen OS 7.8 | 25-100 |
| ATV 4th Gen tvOS 15 | 75-150 |
| Fire TV FireOS 7 | 300-400 |
| Google Mini OS 1.54 | 180-280 |
| Macbook El Capitan 10.11.3 | 180-250 |
| Macbook BigSur 11.5.2 | 200-260 |
| Iphone X iOS 13.9.1 | 180-260 |
| Iphone 12 iOS 14.1 | 195-230 |
| One plus 2 Android version 5 | 178-250 |
| One Plus 6 Android version 11 | 220-280 |
| HP laptop Windows OS 7 | 325-500 |
| Chromebook ChromeOS 94.0 | 60-200 |
| HP laptop Windows OS 10 | 350-400 |
| Ipad iOS 14.7.1 | 195-240 |
| Ipad iOS 10.3.3 | 100-180 |

FIG. 5 illustrates a computing component 500 that includes one or more hardware processors 502 and machine-readable storage media 504 storing a set of machine-readable/machine-executable instructions that, when executed, cause the hardware processor(s) 502 to perform an illustrative method of reducing computing costs while maintaining network services and performance. It should be appreciated that there can be additional, fewer, or alternative steps performed in similar or alternative orders, or in parallel, within the scope of the various examples discussed herein unless otherwise stated. The computing component 500 may be implemented as the server 111 of FIG. 1A, FIG. 1B, FIG.

2, FIG. 3, and FIG. 4. FIG. 5 summarizes and further elaborates on some aspects previously described.

At instruction 510, the hardware processor(s) 502 may execute machine-readable/machine-executable instructions stored in the machine-readable storage media 504 to determine if a quantity difference between a total quantity of multicast packets sent from a first client device (e.g., any of the client devices illustrated in FIG. 1A or FIG. 2) and a baseline range of the first client device is greater than at least one threshold. The server determines the quantity difference between the total quantity of multicast packets sent from the first client device and the baseline range of the first client device by subtracting one from the other. For example, the server determines that the total quantity of multicast packets sent from the first client device in an hour duration is 1120. The server determines that the device type of the first client device is Chromecast, based on the identity information of the multicast packets sent from the first client device. The server determines from the database that Chromecast has a baseline range of 100-210 multicast packets sent per hour. The server determines that the quantity difference between the total quantity and the upper value of the baseline range is 910 (1120 minus 210). The server may obtain the threshold of multicast packets that the first client device can send in a set duration. The threshold is based on the device type of the first client device. A first threshold may be, for example, three times (3×) the upper value of the baseline range of multicast packets sent per hour for the device type of the first client device, or some other value. A second threshold may be, for example, five times (5×) the upper value of the baseline range of multicast packets sent per hour for the device type of the first client device, or some other value that exceeds the first threshold. Many variations are possible. The server determines if the quantity difference is greater than the first threshold or the second threshold. For example, the first client device is the device type of Chromecast. The upper value of the baseline range of the Chromecast device type is 210. The first threshold corresponds to 630 and the second threshold corresponds to 1050. The quantity difference between the total quantity and the upper value of the baseline range of the Chromecast is 910. The server determines that the quantity difference is greater than the three times (3×) threshold and less than the five times (5×) threshold. If the server determines that the quantity difference is greater than at least one of the thresholds, then the server may proceed to instruction 514. Otherwise, the server may proceed to instruction 512.

At instruction 512, the hardware processor(s) 502 may execute machine-readable/machine-executable instructions stored in the machine-readable storage media 504 to permit a client device to continue to transmit multicast packets to the network. The server may permit the first client device to continue to transmit multicast packets to the network in response to determining that the quantity difference between the total quantity of multicast packets sent from the first client device and the baseline range of the first client device is not greater than at least one threshold. For example, the first client device is the device type of Windows. The upper value of the baseline range of the Chromecast device type is 400. The first threshold is 1200 and the second threshold is 2000. The quantity difference between the total quantity and the upper value of the baseline range of the Chromecast is 1000. The server determines that the quantity difference is not greater than the three times (3×) threshold and not greater than the five times (5×) threshold. Thus, the server permits the first client device to continue to transmit multicast packets to the network.

The server may permit a first client device to continue to transmit multicast packets to the network in response to receiving a reply comprising of a positive message. For example, in response to receiving an alert from the server, the first client device may send a reply to the server comprising of a positive message. The positive message may be a message indicating that the first client device will decrease the amount of multicast packets it sends to the network in a set duration. The server may allow or permit the first client device to continue to transmit multicast packets to the network and not label the first client device.

The server may permit a first client device to continue to transmit multicast packets to the network in response to the server labeling the first client device as high risk. In response to labeling the first client device, the server may further permit the first client device to transmit multicast packets to the network.

At instruction 514, the hardware processor(s) 502 may execute machine-readable/machine-executable instructions stored in the machine-readable storage media 504 to send an alert to the first client device. After the server determines that the quantity difference between a total quantity of multicast packets sent from a first client device and a baseline range of the first client device is greater than at least one threshold, the server may send an alert to the first client device. The alert may comprise or include a message (e.g., text, email, etc.) and a sound. The alert may be a message indicating that the first client device is sending too many multicast packets to the network. The alert may be a warning to notify the first client device to decrease the amount of multicast packets that the first client device is transmitting to the network, otherwise the server will block any further multicast packets that the first client device transmits. The alert may be a notification to the client device that an anomalous behavior was detected. The anomalous behavior may be that the quantity difference between a total quantity of multicast packets sent from the first client device and a baseline range of the first client device is greater than at least one threshold.

Additionally or alternatively, the server may send an alarm or alert to an administrator to provide notification of the anomalous behavior. The administrator may provide feedback in response to the alarm to resolve the anomalous behavior. For example, if the administrator receives an alarm regarding the first client device sending an amount of multicast packets greater than at least one threshold, the administrator may send feedback to the server to label the first client device as high risk. Labeling the first client device as high risk may provide notice to all other computing components of the network. Additionally or alternatively, the administrator may send feedback to add the first client device to a restricted list, where the restricted list comprises of computing components such as client devices that may not transmit any multicast packets to the network. Once the first client device is added to the restricted list, the server may block and close any further multicast packets received from the first client device. Thus, in such a scenario, the server may regulate an amount of multicast packets transmitted across a network from client devices within a set duration to monitor the performance, security, and traffic flow of data in the network, and prevent or mitigate any deficiency in the network communication.

At instruction 516, the hardware processor(s) 502 may execute machine-readable/machine-executable instructions stored in the machine-readable storage media 504 to receive a reply from the first client device. After the first client device receives an alert from the server, the first client device may send a reply to the server. The reply may comprise or include a positive message or a negative message. The positive message may be a message indicating that the first client device will decrease the amount of multicast packets it sends to the network in a set duration. The negative message may be a message indicating that the first client device will not decrease the amount of multicast packets it sends to the network in a set duration. The negative message may be no reply received from the first client device in response to the alert sent from the server.

At instruction 518, the hardware processor(s) 502 may execute machine-readable/machine-executable instructions stored in the machine-readable storage media 504 to determine if the reply from the first client device to the server comprises a positive message. The server will determine if the reply from the first client device in response to the alert sent comprises a positive message. For example, the positive message may be a message indicating that the first client device will decrease the amount of multicast packets it sends to the network in a set duration. If the server determines that the reply comprises a positive message, then proceed to instruction 512. If the server determines that the reply does not comprise a positive message, then the server may proceed to instruction 520.

At instruction 520, the hardware processor(s) 502 may execute machine-readable/machine-executable instructions stored in the machine-readable storage media 504 to determine if the quantity difference between the total quantity of multicast packets sent from the first client device and the baseline range of the first client device is greater than five times (5×) the upper value of the baseline range. In response to determining that the reply does not comprise a positive message, the server determines if the quantity difference between the total quantity of multicast packets sent from the first client device and the baseline range of the first client device is greater than five times (5×) the upper value of the baseline range. If the server does determine that the quantity difference is greater than five times (5×) the upper value of the baseline range, then proceed to instruction 524. If the server determines that the quantity difference is not greater than five times (5×) the upper value of the baseline range, then proceed to instruction 522.

At instruction 522, the hardware processor(s) 502 may execute machine-readable/machine-executable instructions stored in the machine-readable storage media 504 to label the first client device. In response to determining that the quantity difference between the total quantity of multicast packets sent from the first client device and the baseline range of the first client device is not greater than five times (5×) the upper value of the baseline range, the server may label the first client device as high risk. Labeling a client device as high risk may provide notice to all other computing components of the network. After labeling the first client device, proceed to instruction 512.

At instruction 524, the hardware processor(s) 502 may execute machine-readable/machine-executable instructions stored in the machine-readable storage media 504 to block multicast packets received from the first client device. In response to determining that the quantity difference between the total quantity of multicast packets sent from the first client device and the baseline range of the first client device is greater than five times (5×) the upper value of the baseline range, the server may block and drop any further multicast packets transmitted from the first client device. In response to determining that the quantity difference is greater than five times (5×) the upper value of the baseline range, the server may add the first client device to a restricted list. The restricted list may comprise a list of computing components in the network that may no longer transmit any multicast packets to the network.

Figure 6:
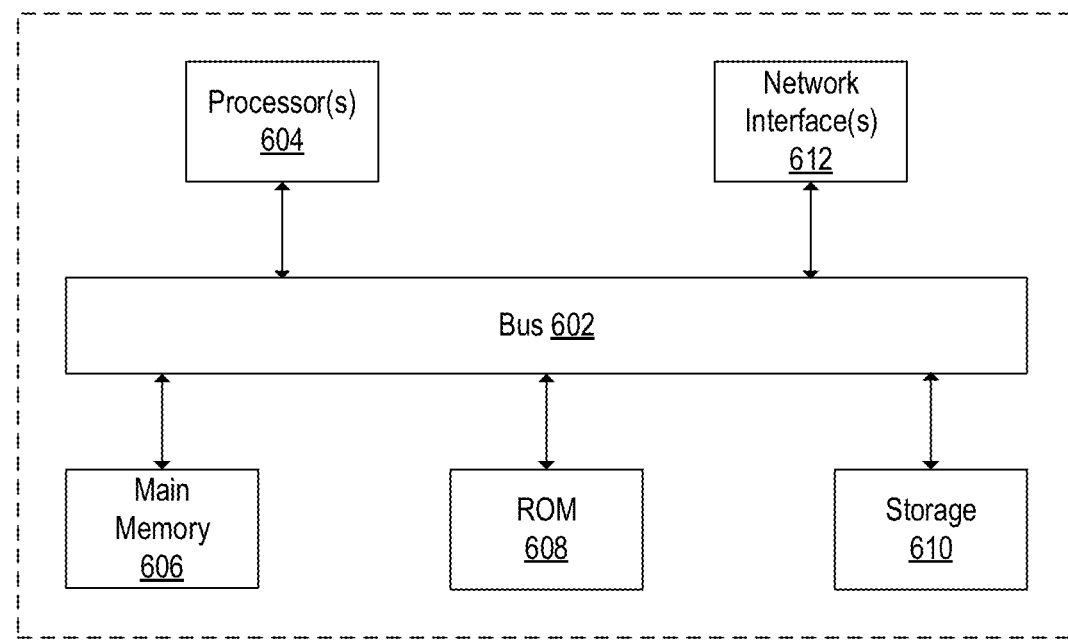
FIG. 6 illustrates a block diagram of an example computer system in which various examples of the present disclosure may be implemented.

FIG. 6 illustrates a block diagram of an example computer system in which various examples of the present disclosure may be implemented. The computer system 600 can include a bus 602 or other communication mechanism for communicating information, one or more hardware processors 604 coupled with the bus 602 for processing information. The hardware processor(s) 604 may be, for example, one or more general purpose microprocessors. The computer system 600 may be an example of a client-server communication or similar device.

The computer system 600 can also include a main memory 606, such as a random access memory (RAM), cache and/or other dynamic storage devices, coupled to the bus 602 for storing information and instructions to be executed by the hardware processor(s) 604. The main memory 606 may also be used for storing temporary variables or other intermediate information during execution of instructions by the hardware processor(s) 604. Such instructions, when stored in a storage media accessible to the hardware processor(s) 604, render the computer system 600 into a special-purpose machine that can be customized to perform the operations specified in the instructions.

The computer system 600 can further include a read only memory (ROM) 608 or other static storage device coupled to the bus 602 for storing static information and instructions for the hardware processor(s) 604. A storage device 610, such as a magnetic disk, optical disk, or USB thumb drive (Flash drive), etc., can be provided and coupled to the bus 602 for storing information and instructions.

Computer system 600 can further include at least one network interface 612, such as a network interface controller module (NIC), network adapter, or the like, or a combination thereof, coupled to the bus 602 for connecting the computer system 600 to at least one network.

In general, the word "component," "modules," "engine," "system," "database," and the like, as used herein, can refer to logic embodied in hardware or firmware, or to a collection of software instructions, possibly having entry and exit points, written in a programming language, such as, for example, Java, C or C++. A software component or module may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices, such as the computing system 600, may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of an executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 600 may implement the techniques or technology described herein using customized hard-wired logic, one or more ASICs or FPGAs, firmware and/or program logic which in combination with the computer system 600 that causes or programs the computer system 600 to be a special-purpose machine. According to one or more examples, the techniques described herein are performed by the computer system 600 in response to the hardware processor(s) 604 executing one or more sequences of one or more instructions contained in the main memory 606. Such instructions may be read into the main memory 606 from another storage medium, such as the storage device 610. Execution of the sequences of instructions contained in the main memory 606 can cause the hardware processor(s) 604 to perform process steps described herein. In alternative examples, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. The non-volatile media can include, for example, optical or magnetic disks, such as the storage device 610. The volatile media can include dynamic memory, such as the main memory 606. Common forms of the non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

The non-transitory media is distinct from but may be used in conjunction with transmission media. The transmission media can participate in transferring information between the non-transitory media. For example, the transmission media can include coaxial cables, copper wire and fiber optics, including the wires that comprise the bus 602. The transmission media can also take a form of acoustic or light waves, such as those generated during radio-wave and infra-red data communications.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain examples include, while other examples do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A computer-implemented method comprising:
   receiving, at the server, multicast packets from a device in a network;
   obtaining, at the server, identity information of the device based on the multicast packets, wherein the identity information comprises a device type and a device address;
   determining, at the server, a quantity of the received multicast packets;
   obtaining, at the server from the database, a stored quantity of multicast packets received from the device over a set duration;
   determining, at the server, a total quantity of the multicast packets received from the device over a set duration, wherein the total quantity is a sum of the quantity of the received multicast packets and the stored quantity of multicast packets;
   obtaining, at the server from the database, a baseline range of multicast packets to be received from the device type of the device in the set duration;
   determining a difference between the total quantity of the multicast packets received and the baseline range of multicast packets; and
   selectively refraining from transmitting the multicast packets if the difference is determined to be more than a threshold.

2. The computer-implemented method of claim 1, wherein the identity information of the device further comprises a device name and a device specification.

3. The computer-implemented method of claim 1, further comprising permitting all unicast packets to be transmitted from the device.

4. The computer-implemented method of claim 1, wherein the threshold is a first threshold or a second threshold, wherein the first threshold is three times that of an upper value of the baseline range of multicast packets and the second threshold is five times that of the upper value of the baseline range of multicast packets.

5. The computer-implemented method of claim 4, further comprising:
   in response to determining the difference to be more than the first threshold, and prior to the selective refraining, sending an alert to the device; and
   receiving a reply from the device, wherein the selective refraining is in response to the reply failing to indicate that the device has reduced an amount of multicast packets to be transmitted to the server.

6. The computer-implemented method of claim 5, further comprising:
   determining whether the reply comprises a positive message, wherein the positive message is indicative of the device sending a smaller amount of multicast packets to the server; and
   in response to the reply comprising the positive message, continuing to permit the transmission of the multicast packets from the device.

7. The computer-implemented method of claim 5, wherein the selective refraining further comprises:
   sending an alert to an administrator or a client device;
   if the total amount of multicast packets is greater than the first threshold, labeling the device as high risk; and
   if the total amount of multicast packets is greater than the second threshold, dynamically blocking the multicast packets transmitted from the device.

8. The computer-implemented method of claim 1, wherein the quantity of the received multicast packets is further based on a packet size of a subset of the multicast packets.

9. The computer-implemented method of claim 8, wherein the quantity of the received multicast packets is further based on a total amount of data within the multicast packets.

10. The computer-implemented method of claim 3, wherein the baseline range is determined based on a type of media data requested by the multicast packets.

11. A computing system comprising:
one or more processors; and
a memory storing instructions that, when executed by the one or more processors, cause the one or more processors to:
receive multicast packets from a device in a network;
obtain identity information of the device based on the multicast packets, wherein the identity information comprises a device type and a device address;
determine a total quantity of the multicast packets received from the device over a set duration, wherein the total quantity is a sum of a quantity of the received multicast packets and a quantity of multicast packets stored in a database from the device;
obtain, from the database, a baseline range of multicast packets to be received from the device type of the device in the set duration;
selectively refrain from transmitting the multicast packets if a difference between the total quantity of the multicast packets received and the baseline range of multicast packets is determined to be more than a threshold; and
continue to transmit the multicast packets if the difference is within the threshold.

12. The computing system of claim 11, wherein the identity information of the device further comprises a device name and a device specification.

13. The computing system of claim 11, wherein the instructions further cause the processors to further comprising permit all unicast packets to be transmitted from the device.

14. The computing system of claim 11, wherein the threshold is a first threshold or a second threshold, wherein the first threshold is three times that of an upper value of the baseline range of multicast packets and the second threshold is five times that of the upper value of the baseline range of multicast packets.

15. The computing system of claim 14, wherein the instructions further cause the processors to:
prior to the selective refrain if the difference is more than the threshold, sending an alert to the device; and
receive a reply from the device, wherein the selective refrain is in response to the reply failing to indicate that the device has reduced an amount of multicast packets to be transmitted to the server.

16. The computing system of claim 15, wherein the instructions further cause the processors to:
determine whether the reply comprises a positive message, wherein the positive message is indicative of the device sending a smaller amount of multicast packets to the server; and
in response to the reply comprising the positive message, continue to permit the transmission of the multicast packets from the device.

17. The computing system of claim 15, wherein the selective refraining further comprises:
send an alert to an administrator or a client device;
if the total amount of multicast packets is greater than the first threshold, label the device as high risk; and
if the total amount of multicast packets is greater than the second threshold, dynamically block the multicast packets transmitted from the device.

18. The computing system of claim 11, wherein the quantity of the received multicast packets is further based on a packet size of a subset of the multicast packets.

19. The computing system of claim 18, wherein the quantity of the received multicast packets is further based on a total amount of data within the multicast packets.

20. A non-transitory storage medium storing instructions that, when executed by at least one processor of a server, cause the server to perform a method comprising:
receiving, at a server, multicast packets from a device in a network;
obtaining, at the server, identity information of the device based on the multicast packets, wherein the identity information comprises a device type and a device address;
determining, at the server, a quantity of the received multicast packets;
obtaining, at the server from a database, a stored quantity of multicast packets received from the device over a set duration;
determining, at the server, a total quantity of the multicast packets received from the device over a set duration, wherein the total quantity is a sum of the quantity of the received multicast packets and the stored quantity of multicast packets;
obtaining, at the server from the database, a baseline range of multicast packets to be received from the device type of the device in the set duration;
determining a difference between the total quantity of the multicast packets received and the baseline range of multicast packets; and
determining the difference is greater than a first threshold; and
in response to determining the difference is greater than the first threshold, selectively refraining the device, wherein the selective refraining the device comprises:
sending an alert to the device;
receiving a reply from the device;
determining if the reply fails to indicate that the device has reduced an amount of multicast packets to be transmitted to the server;
in response to the failed reply, sending an alarm to an administrator;
if the total amount of multicast packets is at least the first threshold, labeling the device as high risk; and
if the total amount of multicast packets is at least a second threshold, dynamically blocking the multicast packets transmitted from the device, wherein the second threshold exceeds the first threshold.

* * * * *